United States Patent
Sankrithi

[19]

[11] Patent Number: 6,131,980
[45] Date of Patent: Oct. 17, 2000

[54] FOLDABLE PICKUP BED FOR MOTOR VEHICLES

[76] Inventor: Siva U. M. Sankrithi, 2822 Broadway Ave. E., Seattle, Wash. 98102

[21] Appl. No.: 09/004,797

[22] Filed: Jan. 9, 1998

[51] Int. Cl.[7] .................................................. B62D 33/00
[52] U.S. Cl. ..................................... 296/26.11; 296/26.08
[58] Field of Search ........................... 296/26.08, 26.11, 296/26.15, 162, 165

[56] References Cited

U.S. PATENT DOCUMENTS

| | | | |
|---|---|---|---|
| 1,242,035 | 10/1917 | Pierson et al. | 296/26.11 |
| 1,452,394 | 4/1923 | Simon | 296/26.11 |
| 1,919,063 | 7/1933 | Hubbard | 296/26.11 |
| 2,188,545 | 1/1940 | Smelker | 296/26.11 |
| 2,230,334 | 2/1941 | Roberts | 296/26.11 |
| 2,353,820 | 7/1944 | Eddins | 296/26.11 |
| 4,223,939 | 9/1980 | Beggs | 296/26.11 |
| 4,472,639 | 9/1984 | Bianchi | 296/26.11 |
| 4,522,143 | 6/1985 | Holzbaur | 296/26.11 |
| 4,995,664 | 2/1991 | Buday | 296/165 |
| 5,417,468 | 5/1995 | Baumgartner et al. | 296/162 |
| 5,800,002 | 9/1998 | Tiedge et al. | 296/26.15 |
| 5,857,724 | 1/1999 | Jarman | 296/26.11 |

*Primary Examiner*—D. Glenn Dayoan
*Assistant Examiner*—Jason Morrow

[57] ABSTRACT

This invention provides a foldable pickup bed for motor vehicles such as vans. When deployed, the pickup bed extends behind the motor vehicle and can carry cargo loads. When folded up, the pickup bed extends a shorter distance behind the vehicle and encloses an area or volume of space connecting with an internal cargo space in the vehicle.

2 Claims, 6 Drawing Sheets

FOLDABLE PICKUP BED FOR MOTOR VEHICLES

BACKGROUND OF THE INVENTION

Motor vehicles such as automobiles, vans, and minivans provide enclosed cabins suitable for carrying passengers and certain types of cargo. Other motor vehicles such as pickup trucks provide an open-top pickup bed (also called "cargo bed") suitable for carrying certain types of cargo, which are not exactly the same as the types which can be carried in automobiles, vans, and minivans. For example, oversize cargo of "dirty" cargo such as soil, bark, wood chips, or fertilizer are obviously better carried in a pickup bed than in the interior of an enclosed vehicle compartment. Currently, customers for motor vehicles need to choose between enclosed type vehicles and pickup type vehicles, and do not have the flexibility to convert their vehicle from one to the other type of vehicle.

BRIEF SUMMARY OF THE INVENTION

This invention provides a foldable pickup bed for vehicles such as vans, minivans or stationwagons, to enable these vehicles to carry oversize or "dirty" cargo when desired. The invention may be either retrofitted to existing vehicles, or designed into new vehicles. The pickup bed is foldable rather than fixedly attached to the vehicle, to enable a significant reduction in overall vehicle length when the pickup bed is in its folded configuration.

DETAILED DESCRIPTION

The invention can be better understood with reference to the following details, as relating to the illustrated embodiments of the invention.

Figure 1A:
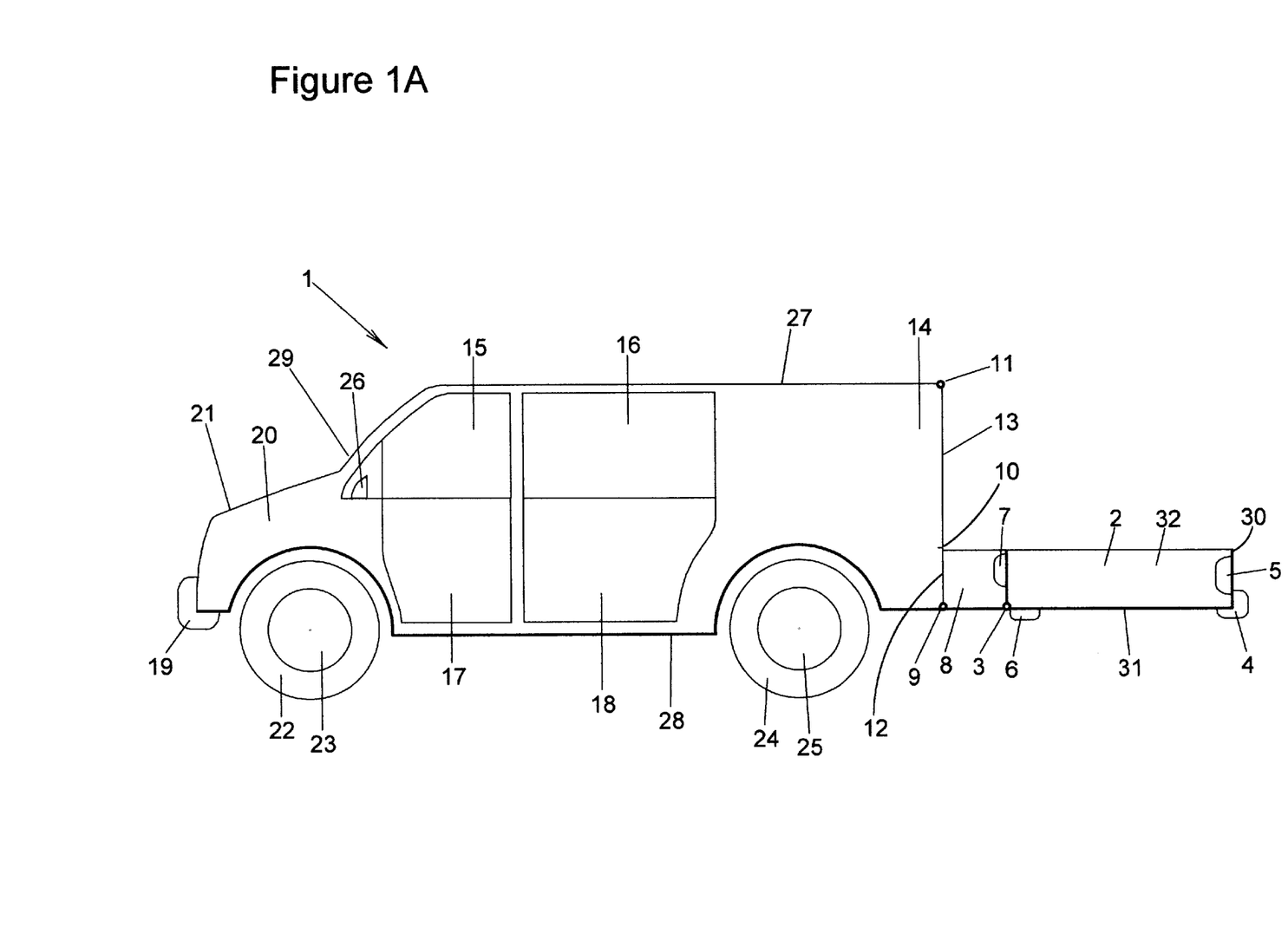
FIG. 1A shows a typical embodiment (example) of the invention with the pickup bed in its deployed configuration.

FIG. 1A shows a motor vehicle 1, which may for example be a van, minivan, stationwagon, sedan, convertible, or other type of motor vehicle. The motor vehicle 1 includes running gear means including front wheel 23 and front tire 22, and rear wheel 25 and rear tire 24, which together comprise more than one wheel and more than one tire. The illustrated motor vehicle 1 also includes a front bumper 19, an engine compartment 20 for an engine or motor under a hood 21, a roof of the vehicle body 27, a floor of the vehicle body 28, and a front windshield 29. A typical front door 17 is shown with a front side window 15, and a typical rear door 18 is shown with a rear side window 16. The doors may be of hinged, sliding, or other type, and the side windows may be openable. A rear view mirror housing 26 is also illustrated, for housing an external rear view mirror. The features recited in this paragraph are typical, and should not be construed to limit the invention.

A pickup bed (cargo bed) 2 is attached behind this vehicle by hinged attachment means 3, which include means for fixing the pickup bed either in its deployed configuration (shown in FIG. 1A) or in its folded up or retracted configuration (shown in FIG. 1B), and for moving the pickup bed between these two configurations by serving as means for permitting the pickup bed to be rotated, in the specific illustrated embodiment, approximately ninety degrees from a substantially horizontal orientation of the floor of the pickup bed suitable for carrying a cargo load on said floor, to a substantially nonhorizontal orientation which is substantially vertical, of the floor of the pickup bed in its folded up configuration. The hinged attachment means 3 connect the pickup bed 2 to the main structure of the motor vehicle 1 through connecting structure 8 which preferably includes floor and side wall structural components. When the pickup bed 2 is deployed, as shown in FIG. 1A, bumper 4 serves as the rear bumper of the vehicle. Bumper 4 serves as rear bumper means for protecting the rear end of the motor vehicle 1 from significant damage in the event of a low speed rear end collision. Tail lights 5 serve as rear light means for providing light visible from behind the motor vehicle (including rear light, turn signal light, and back-up light elements). A tailgate 30 is preferably provided at the rear end of the pickup bed 2, to permit cargo to be easily loaded onto and unloaded from the pickup bed floor 31 of the pickup bed 2. Note that in alternate versions (embodiments) of the invention the tailgate may be hinged on its bottom or side edges, and in still other alternate versions (embodiments) openable gate means may be included in the pickup bed side walls 32 (which openable gate means can serve as means for loading items into the pickup bed 2 when the pickup bed is in its deployed configuration) instead of or in addition to a tailgate 30.

Thus the illustrated pickup bed 2 has a pickup bed floor 31 which serves as means for carrying a cargo load when the pickup bed 2 is positioned in its deployed configuration (as in FIG. 1A); has a tailgate 30 which serves as means for permitting cargo to be loaded into and unloaded from the pickup bed floor 31; and also has pickup bed side walls 32 (preferably substantially rigidly and nonhingedly attached to the floor of the pickup bed, as illustrated), which serve as lateral restraint means for laterally restraining such a cargo load carried on the floor of the pickup bed when the pickup bed is in its deployed configuration.

Bumper 6 is not functional when the pickup bed 2 is in its illustrated deployed configuration, and tail lights 7 may of may not be functional when the pickup bed 2 is deployed, as shown in FIG. 1A.

The rear wall of the main enclosed compartment (body) of the motor vehicle 1 is shown here as made up of two panels, a rear lower panel 12 and a rear upper panel 13, which are hingedly attached to the vehicle body at lower panel hinge means 9 and upper panel hinge means 11, respectively. The rear upper panel 13 may optionally include a transparent portion to serve as a rear window for the motor vehicle. The two illustrated panels 12 and 13 meet together and are connected by illustrated latch means 10. In alternate embodiments the rear wall may comprise one, two, three, or more rear panels, which may be hinged on their top edge, bottom edge, or side edges. For example, as is known in previous vans, two side edge hinged doors or panels may be used, or two side edge hinged doors or panels for the bottom part of the rear wall and a top edge hinged hatch door or panel for the top part, as for instance in the arrangement found for some Chevrolet Astro minivans.

The area immediately in front of the rear panels will preferably be a rear cargo area 14, but may also alternately be a passenger seating area. In the illustrated embodiment, the panels 12 and 13 together comprise openable rear panel means behind the rear cargo area means (rear cargo area 14). More specifically, the openable rear panel means include a rear lower panel 12 (which serves as lower rear closure means) and rear upper panel 13 (which serves as upper rear closure means), which are hingedly attached to the vehicle body at lower panel hinge means 9 and upper panel hinged means 11 for hingedly attaching these panels. The cargo area openable rear panel means, when not opened, substantially enclose the rear cargo area means and segregate the motor vehicle's internal cargo carrying area on the cargo area floor in the rear cargo area means, from the motor vehicle's external cargo carrying area on the floor of the pickup bed and the floor of the connecting structure, when said pickup bed is in its deployed configuration, as illustrated.

Thus, the embodiment shown in FIG. 1A with the pickup bed 2 deployed, can carry some oversize or dirty cargo externally, on the pickup bed 2, as well as some other cargo internally in the rear cargo area 14. If very large or long cargo is to be carried, one or more of the rear panels 12 and 13 could be left open, and the cargo carried partly in the pickup bed 2 and partly inside the vehicle (e.g., in cargo area 14).

Figure 1B:
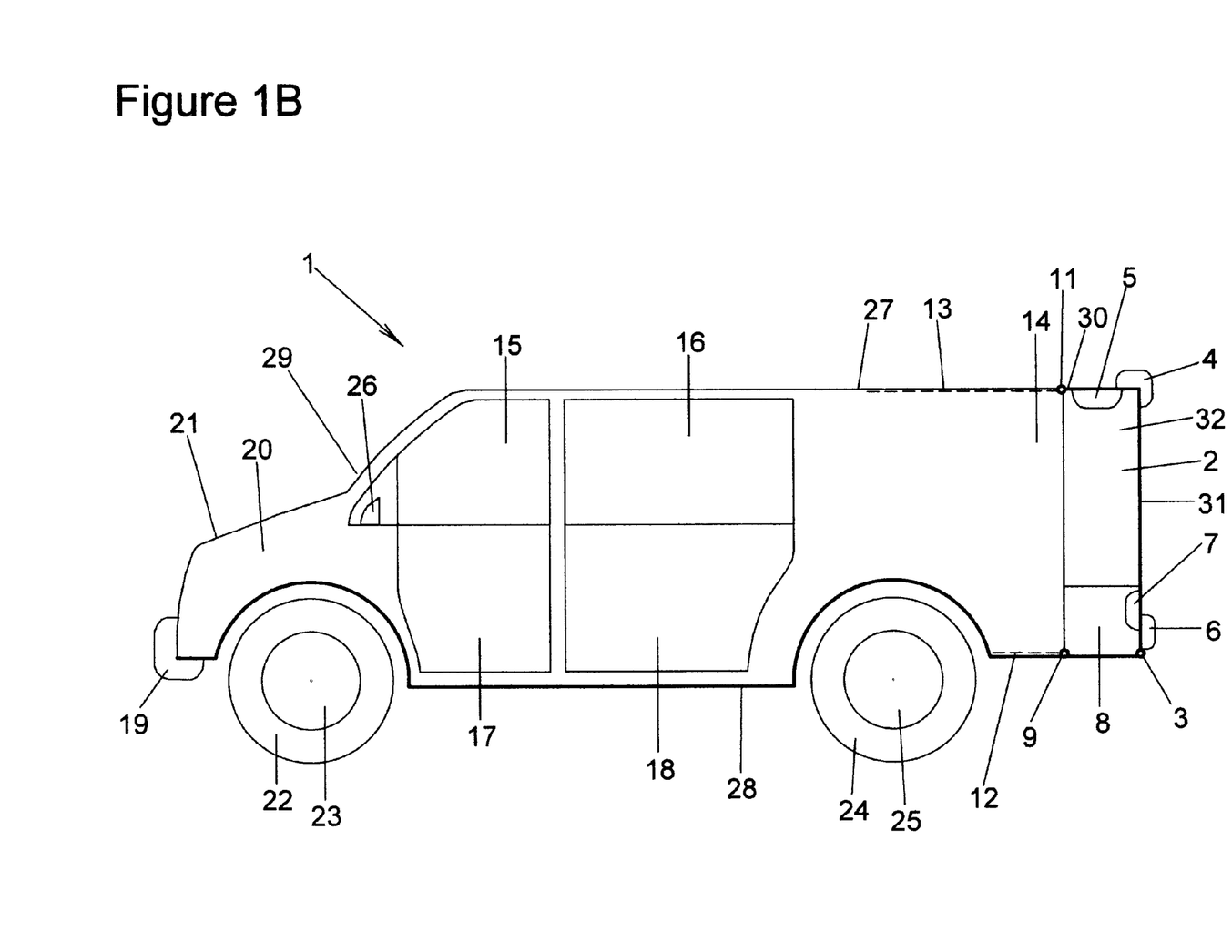
FIG. 1B shows the same vehicle as shown in FIG. 1A, but with the pickup bed in its folded up or retracted configuration.

FIG. 1B shows the same vehicle as in FIG. 1A, but with the pickup bed 2 in its folded or retracted configuration. This configuration could be used for day to day operations when it is not desired to carry oversize or dirty cargo in the motor vehicle 1, and when it is desired to reduce the overall length of the vehicle to ease maneuvering and to permit parking in a garage or a normal parking stall. The pickup bed 2 is folded up around the hinged attachment means 3 to a substantially vertical orientation, wherein the pickup bed floor 31 now forms a rear wall of the motor vehicle 1 behind the vehicle body, when the pickup bed 2 is in its illustrated folded up configuration. This pickup bed floor 31 now forming the rear wall, may optionally include transparent elements which serve as rear window means for seeing behind the vehicle when the pickup bed 2 is in its folded up configuration, and may optionally have openable elements to facilitate loading of items into the motor vehicle when the pickup bed 2 is in its folded up configuration. The location of the hinged attachment means 3 may be varied in different versions of the invention.

Thus the illustrated embodiment of FIGS. 1A and 1B shows a motor vehicle 1, having: a vehicle body (including the roof of the vehicle body 27 and the floor of the vehicle body 28) which serves as means for carrying at least one person and at least some cargo, motor means (in engine compartment 20) for powering the motor vehicle, running gear means (including front wheel 23, front tire 22, rear wheel 25, and rear tire 24) for supporting the vehicle body and for permitting the motor vehicle 1 to move and maneuver on a road surface, and rear cargo area means (rear cargo area 14 including a cargo area floor, cargo area side walls, cargo area roof, and cargo area openable rear panel means such as illustrated rear panels 12 and 13) for carrying cargo inside the rear part of the vehicle body, and further having an improvement comprising the addition of: a pickup bed 2 connected to the motor vehicle 1 behind the rear cargo area means through hinged attachment means 3 and connecting structure 8, wherein the hinged attachment means 3 provides means for the pickup bed 2 to be positioned either in a deployed configuration (FIG. 1A) suitable for carrying cargo on the floor of the pickup bed (pickup bed floor 31), or in a folded up configuration (FIG. 1B) which reduces the overall length of the motor vehicle 1 relative to the deployed configuration.

Figure 1C:
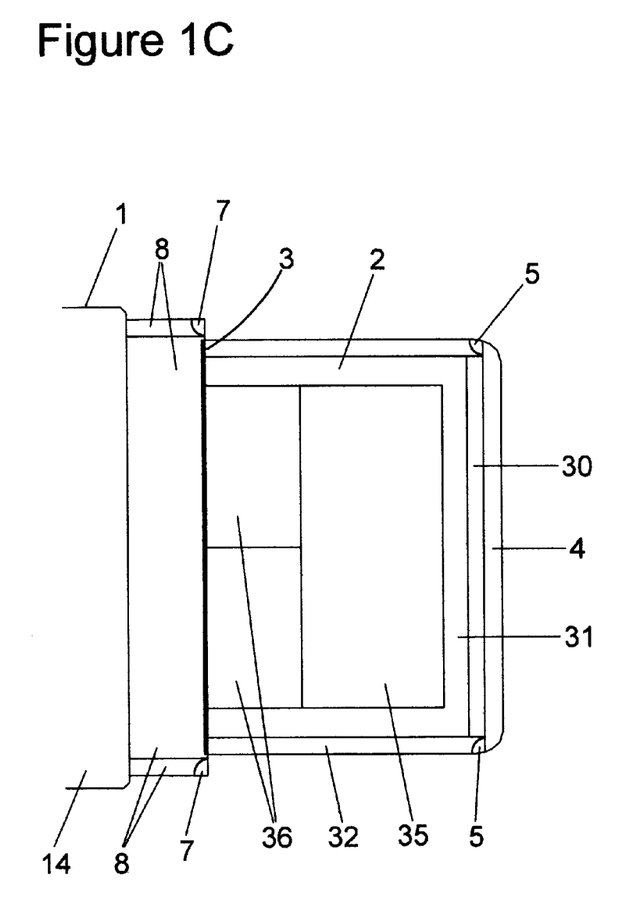
FIG. 1C shows the embodiment of FIG. 1A in plan view.

The illustrated embodiment of FIGS. 1A, 1B and 1C also show a foldable pickup bed comprising: a pickup bed 2 with a pickup bed floor 31 which serves as means for carrying a cargo load, hinge means (hinged attachment means 3) connected to said pickup bed 2 for permitting said pickup bed 2 to be rotated from a substantially horizontal pickup bed floor orientation (as in FIG. 1A, wherein the floor of the pickup bed is located substantially contiguous to and behind the floor of the connecting structure 8 and wherein the forward end regions of the side walls of the pickup bed are substantially contiguous to the aft end regions of the side walls of the connecting structure 8, as illustrated) suitable for carrying said cargo load to a substantially nonhorizontal folded up pickup bed floor orientation (as in FIG. 1B, where the pickup bed floor orientation is substantially vertical), and connecting structure means (connecting structure 8 which includes a floor of the connecting structure extending aft behind said cargo area floor and further includes side walls of the connecting structure, as illustrated) for connecting said pickup bed 2 through hinged attachment means (located in the region of the aft end of the floor of the connecting structure, as illustrated) to a motor vehicle 1 at a location substantially behind said motor vehicle 1. The pickup bed 2 occupies less lengthwise distance behind said motor vehicle 1 when it is in the substantially vertical pickup bed floor orientation shown in FIG. 1B.

In the folded pickup bed configuration of FIG. 1B, bumper 6 serves as the rear bumper of the vehicle, and tail lights 7 serve as the rear lights for the vehicle. Thus the rear bumper means includes different functioning bumper elements for the cases when the pickup bed is in its deployed configuration (bumper 4, in FIG. 1A) or folded up configuration (bumper 6, in FIG. 1B), and the rear light means includes different functioning light elements for the cases when the pickup bed is in its deployed configuration (tail lights 5 and possibly also 7, in FIG. 1A) or folded up configuration (tail lights 7, in FIG. 1B). The rear panels 12 and 13 may be in their open positions, as illustrated, or in their closed positions. If they are open, the rear cargo area 14 now extends into the pickup bed 2, together forming a larger and still enclosed cargo carrying area or volume. The connecting structure 8 provides the enclosing floor under the pickup bed part of this area or volume. Conventional latch and seal means may be provided for latching the pickup bed 2 in its folded up configuration to the connecting structure 8 and vehicle body, and for sealing any small gaps between the edges of the tailgate 30 and the pickup bed side walls 32 on one hand, and the applicable mating rear surfaces or edges of the connecting structure 8 and vehicle body on the other hand, when the pickup bed is in its folded up configuration. For example, in the illustrated embodiment latch means are assumed to be integrated into the upper panel hinge means 11. Pickup bed folding means may be either manual, power assisted, or motor driven, using mechanisms and or motors known from the prior art. Thus force assist means for reducing the manual effort required to rotate the pickup bed to its folded up configuration, and/or motor means for rotating the pickup bed from its deployed configuration to its folded up configuration and from its folded up configuration to its deployed configuration, may optionally be provided.

The tailgate 30 will be on the top side of the vehicle now, and may be usable (but hard to use) for loading and unloading cargo. For the previously mentioned case where openable gate means are optionally provided in the pickup bed side walls 32, these openable gate means may be usable means for loading items into the rear cargo area means (cargo area 14) and its extension into the pickup bed 2

(above the connecting structure 8), when the pickup bed is in its folded up configuration illustrated in FIG. 1B.

FIG. 1C shows the embodiment of FIG. 1A in plan view. FIG. 1C more clearly illustrates some aspects of the invention, such as the illustrated mounting of the tail lights 7 at the back end of the connecting structure 8 in such a manner that these tail lights 7 do not move whether the pickup bed is deployed or folded up, and can be visible from behind the vehicle and not blocked by the bumper 4 or other parts of the pickup bed, whether deployed or folded up. FIG. 1C also illustrates the side walls 32 of the pickup bed and the side walls of the connecting structure 8 being laterally displaced relative to each other sufficiently to enable non-interference between them when the pickup bed is moved to its folded up configuration from the illustrated deployed configuration.

Figure 2:
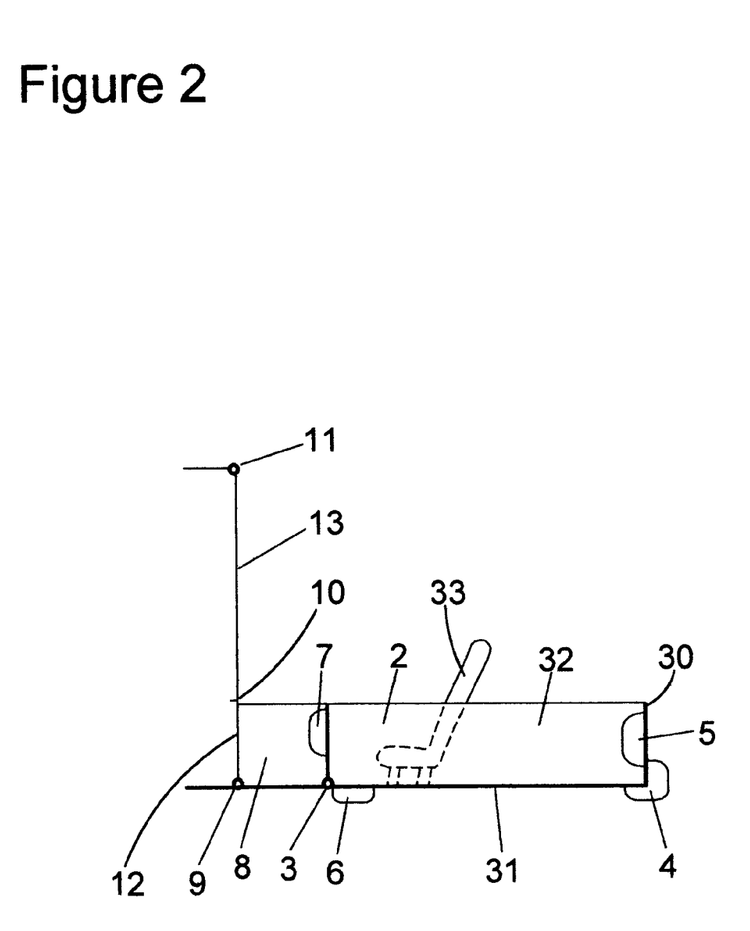
FIG. 2 shows an embodiment of the invention with the pickup bed deployed, which also has seating means in the pickup bed.

FIG. 2 illustrates an embodiment of the invention further comprising seat means 33 for carrying (seating) at least one person on the pickup bed 2 when it is in its deployed configuration, for a motor vehicle similar to that shown in FIG. 1A. For example, two side-by-side seats could be provided, along with suitable restraint means such as seatbelts. The seating means will preferably be retractable and/or removable when the pickup bed 2 is moved to its folded up or retracted configuration, as in FIG. 1B.

Figure 3A:
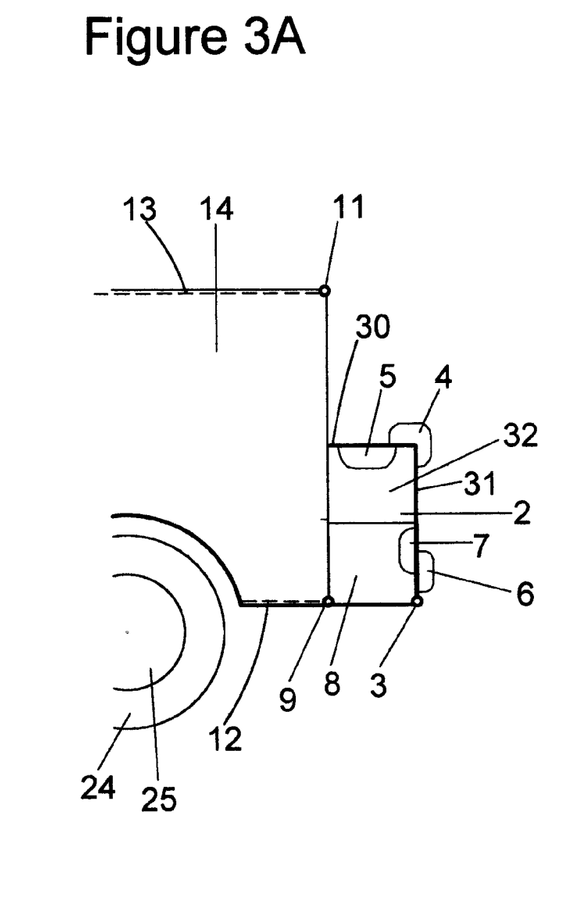
FIGS. 3A and 3B show another embodiment of the invention with a shorter pickup bed, with the pickup bed in its folded up and deployed configurations respectively.
Figure 3B:
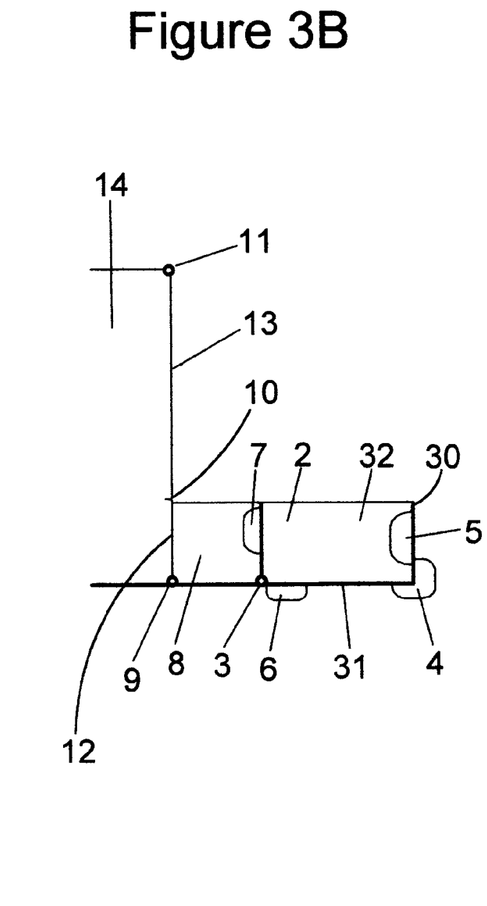

FIGS. 3A and 3B illustrate another embodiment of the invention similar to the embodiment of FIGS. 1B and 1A, with a pickup bed 2 in its folded up or retracted configuration in FIG. 3A and in its deployed configuration in FIG. 3B. In the embodiment of FIGS. 3A and 3B, the pickup bed 2 is shorter than in the embodiment of FIGS. 1B and 1A. In FIG. 3A, the height of the pickup bed in its folded up configuration is less than the height of the vehicle body. Also in FIG. 3A, rear lower panel 12 and rear upper panel 13 are shown in their inward folded configurations, as in FIG. 1B. While driving, rear upper panel 13 of FIG. 3A will preferably be in a substantially vertical (enclosing) configuration and include a transparent portion which serves as a rear window of the motor vehicle. In alternate variant embodiments similar to that of FIG. 3A, a shorter rear upper panel 13 can be used, which only comes down to the region of the upper lip of the tailgate 30. This shorter rear upper panel would also include a rear window portion, and the panel could be fixed or could be outwardly openable around upper panel hinge means 11 to serve as a loading hatch in a manner similar to prior art hatchback automobiles. In this case the improvement afforded by the invention further comprises the height of the pickup bed in its folded up configuration being less than the height of the vehicle body, and means for the upper rear closure means to be opened to permit cargo to be loaded into the rear cargo area above the top of the pickup bed, when the pickup bed is in its folded up configuration. In the case of the rear panel 13 being shorter, the rear lower panel 12 will preferably be correspondingly longer, and could be fixed or foldable/retractable using a variety of mechanisms including bi-fold or reel-out mechanisms known from the prior art.

The embodiment shown in FIG. 3A also illustrates means for the lower rear closure means 12 to be opened for enabling the floor of the rear cargo area 14 and the floor of the connecting structure 8 to together serve as the floor area of an expanded rear cargo area means, which expanded rear cargo area means is enclosable at its aft end by the pickup bed in its folded up configuration (as illustrated), with the floor of the pickup bed contributing as an aft enclosure and the side walls of the pickup bed contributing as side enclosures and with a tailgate 30 of the pickup bed contributing as a top enclosure to the expanded rear cargo area means, and with means for the tailgate of the pickup bed to be opened up to permit cargo to be loaded into the expanded rear cargo area means when the pickup bed is in its folded up configuration (as illustrated).

Figure 3C:
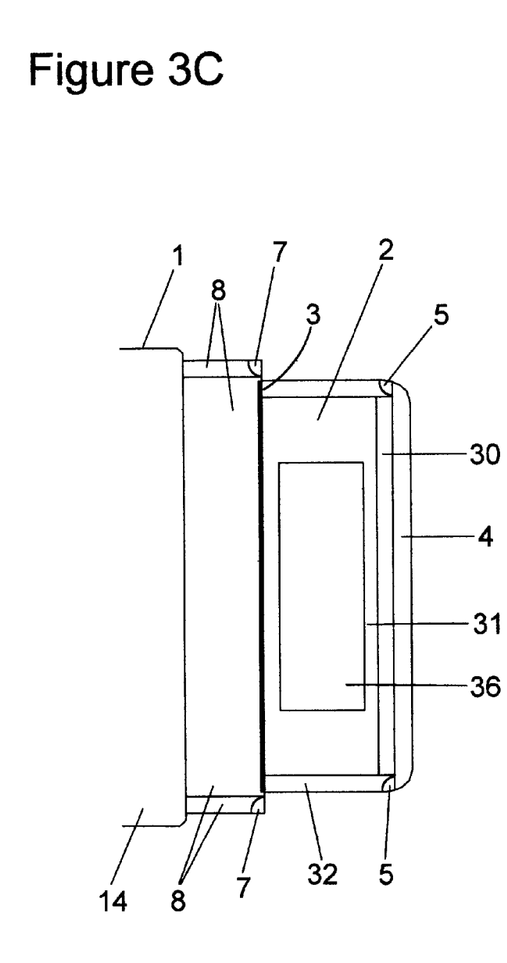
FIG. 3C shows the embodiment of FIG. 3B in plan view.

FIG. 3C shows the embodiment of FIG. 3B in plan view, in a manner similar to FIG. 1C showing the embodiment of FIG. 1A in plan view.

While certain features of the invention have been described in detail with reference to the Figures, which Figures show certain preferred embodiments (versions) of the invention, it should be understood that further variations and modifications of the invention are possible within the spirit and scope of the invention as defined in the following claims.

What is claimed is:

1. In a motor vehicle having
   a vehicle body which serves as means for carrying at least one person and at least some cargo,
   motor means for powering the motor vehicle,
   running gear means for supporting the vehicle body and for permitting the motor vehicle to move and maneuver on a road surface,
   and rear cargo area means for carrying cargo inside the rear part of the vehicle body which rear cargo area means includes a cargo area floor, cargo area side walls, cargo area roof, and cargo area openable rear panel means,
   the improvement comprising the addition of:
   a pickup bed connected to the motor vehicle behind the rear cargo area means through hinged attachment means and connecting structure,
   wherein said pickup bed includes a floor of the pickup bed and side walls of the pickup bed,
   wherein said connecting structure includes a floor of the connection structure extending aft behind said cargo area floor and further includes side walls of the connecting structure,
   wherein the hinged attachment means is located in the region of the aft end of said floor of the connecting structure,
   wherein the hinged attachment means provides means for the pickup bed to be positioned either in a deployed configuration suitable for carrying cargo on the floor of the pickup bed with the floor of the pickup bed in a substantially horizontal orientation and located substantially contiguous to and behind the floor of the connecting structure, or in a folded up configuration which reduces the overall length of the motor vehicle relative to the deployed configuration,
   wherein in said deployed configuration the forward end regions of the side walls of the pickup bed are substantially contiguous to the aft end regions of the side walls of the connection structure,
   wherein the side walls of the pickup bed and the side walls of the connecting structure are laterally displaced relative to each other sufficiently to enable noninterference between them when the pickup bed is in the folded up configuration,
   and wherein the pickup bed floor includes transparent elements which serve as rear window means for seeing behind the vehicle when the pickup bed is in its folded up configuration.

2. A foldable pickup bed with connection means using hinged attachment means and connecting structure for connecting the foldable pickup bed to a motor vehicle at a location behind an internal rear cargo area in the motor vehicle, wherein said foldable pickup bed includes a floor of the pickup bed and side walls of the pickup bed, wherein said connecting structure includes a floor of the connecting structure extending aft behind said internal real cargo area and further includes side walls of the connecting structure, wherein the hinged attachment means is located in the region of the aft end of said floor of the connecting structure, wherein the hinged attachment means provides means for the pickup bed to be positioned either in a deployed configuration suitable for carrying cargo on the floor of the pickup bed with the floor of the pickup bed in a substantially horizontal orientation and located substantially contiguous to and behind the floor of the connecting structure, or in a folded up configuration which reduces the overall length of the motor vehicle relative to the deployed configuration, wherein in said deployed configuration the forward end regions of the side walls of the pickup bed are substantially contiguous to the aft end regions of the side walls of the connecting structure, wherein the side walls of the pickup bed and the side walls of the connecting structure are laterally displaced relative to each other sufficiently to enable noninterference between them when the pickup bed is in the folded up configuration, and wherein the improvement further comprises openable elements in the floor of the pickup bed to facilitate loading of items into the motor vehicle, when the pickup bed is in its folded up configuration.

* * * * *